Dec. 12, 1967   R. D. COLCHAGOFF   3,357,809
GLASS FORMING APPARATUS
Filed Dec. 5, 1966   3 Sheets-Sheet 1
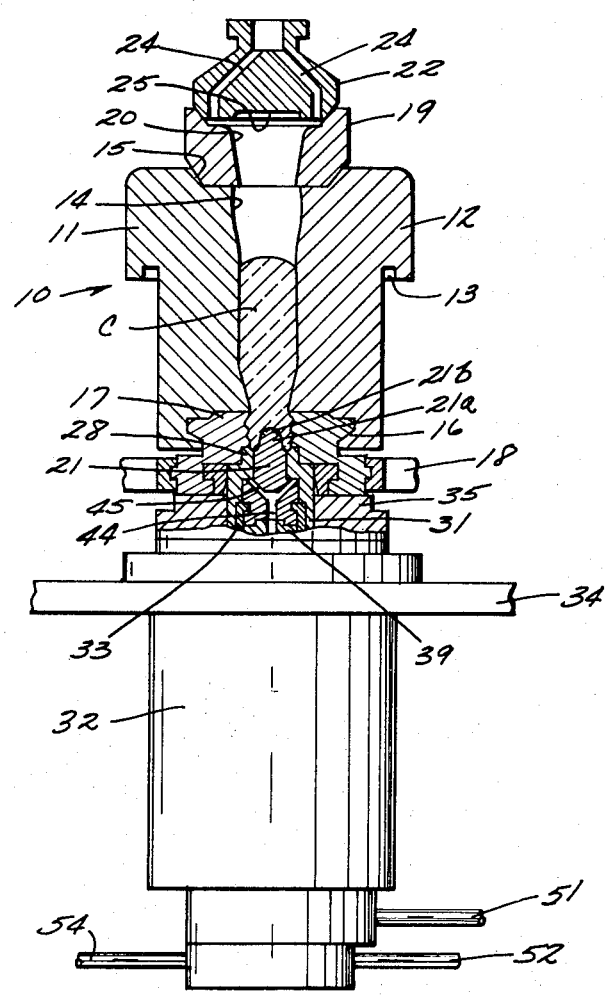
INVENTOR.
ROBERT D. COLCHAGOFF
BY J. R. Nelson
and W. A. Schaich
ATTORNEYS

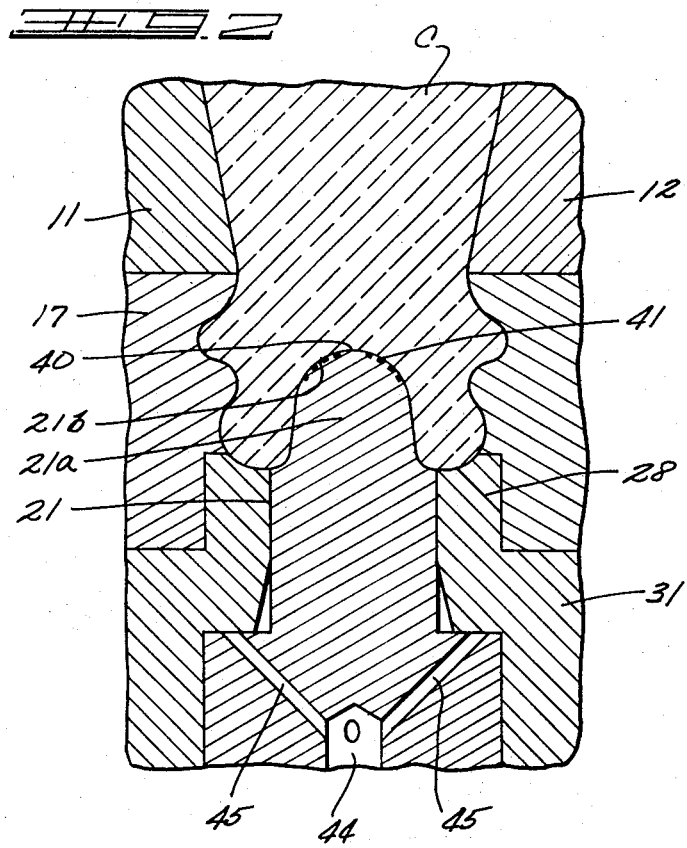
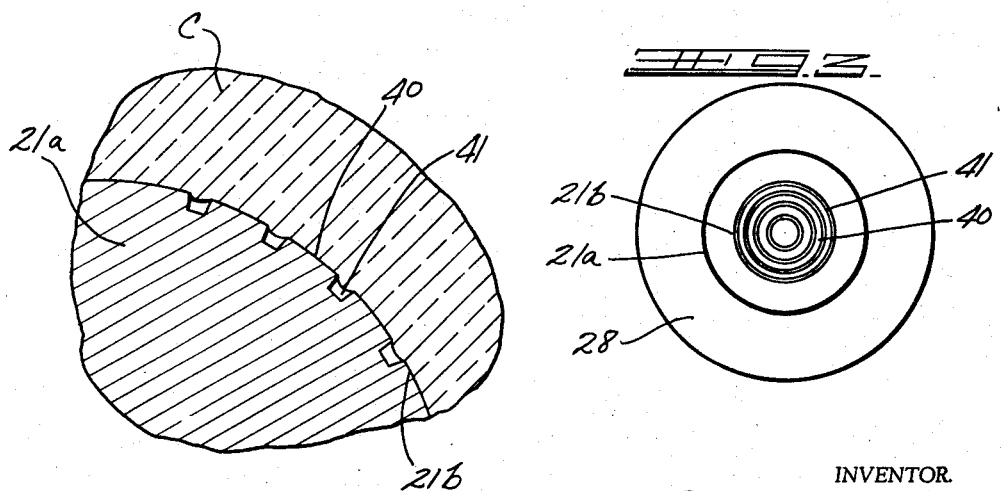

Dec. 12, 1967 R. D. COLCHAGOFF 3,357,809
GLASS FORMING APPARATUS
Filed Dec. 5, 1966 3 Sheets-Sheet 3
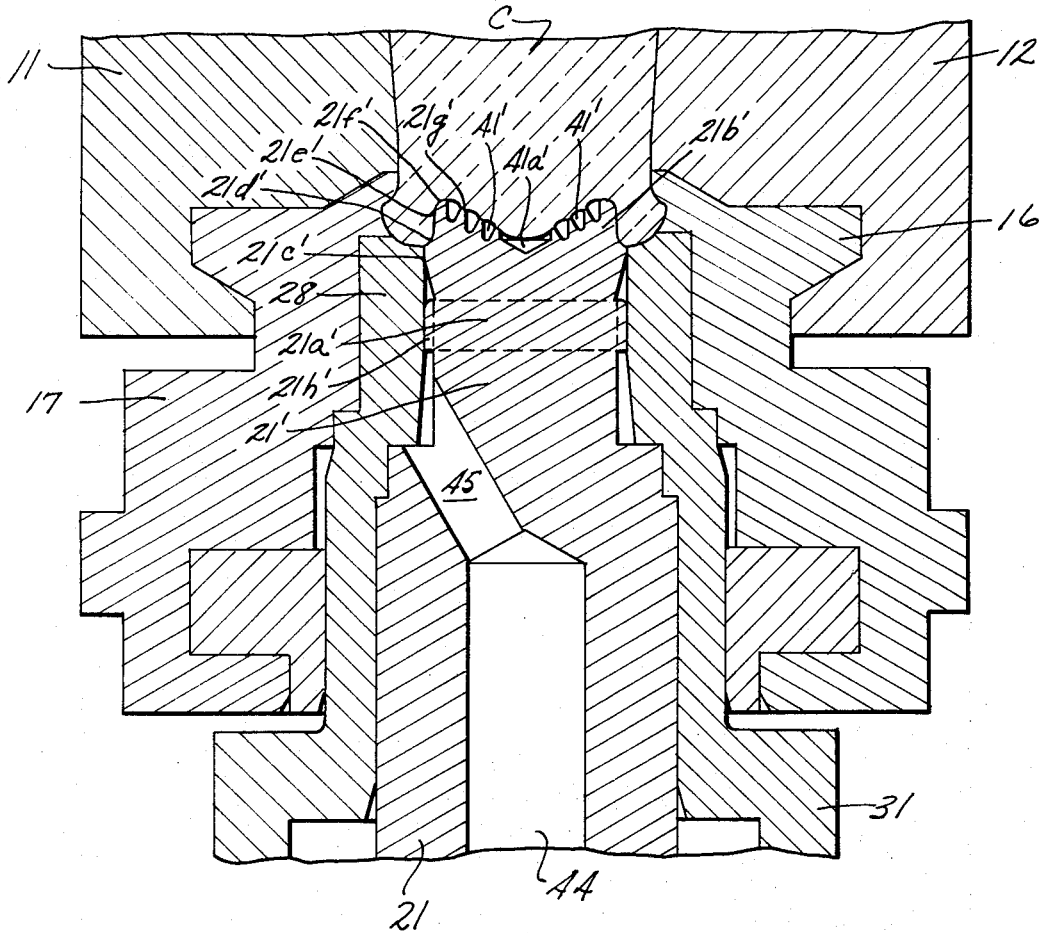
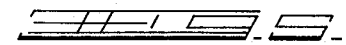
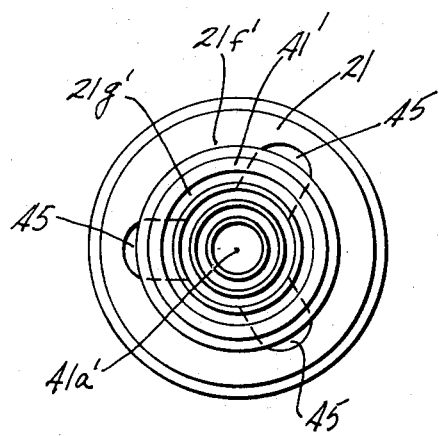
INVENTOR.
ROBERT D. COLCHAGOFF
BY
J. R. Nelson
and W. A. Schaich
ATTORNEYS United States Patent Office 3,357,809
Patented Dec. 12, 1967

3,357,809
GLASS FORMING APPARATUS
Robert D. Colchagoff, Toledo, Ohio, assignor to Owens-Illinois, Inc., a corporation of Ohio
Filed Dec. 5, 1966, Ser. No. 599,203
4 Claims. (Cl. 65—229)

ABSTRACT OF THE DISCLOSURE

The glass forming apparatus disclosed herein is intended for use in a blow-and-blow process of making bottles and like ware. The improvement comprises a neck pin or plunger which has a body and tip portion that upon insertion into the neck forming cavity of a blank mold contacts the glass to form a corkage bore portion surrounding a bubble forming portion in the glass parison. The bubble forming portion of the tip is formed with a symmetrical array of surface projections and intermediate spaces such that the glass is contacted by the surface projections to form a plurality of symmetrically disposed relatively cooled areas and intermediate relatively uncooled areas in the glass. The projections preferably comprise annular concentric ribs. In one form, the bubble forming portion of the tip is convex and, in another form, the bubble forming portion of the tip is concave.

---

This is a continuation-in-part of my copending application Ser. No. 354,997, filed Mar. 26, 1964 now abandoned.

The present invention relates to an improvement in a glassware forming apparatus for forming hollow articles of glassware, and more particularly, relates to a parison forming unit and an improved neck pin or plunger that produces glass containers from a formed parison in which difficulties such as chokes and settlewave in the blown glassware is substantially eliminated. The invention constitutes an improvement of the invention shown and described in my earlier application Ser. No. 307,104, filed Sept. 6, 1963 now Patent No. 3,305,344 issued Feb. 21, 1967.

In the known blow-and-blow process of making bottles and like ware, a charge of molten glass is loaded onto a partible blank mold and neck mold while the two are assembled and registered in a glass forming position to define a parison forming cavity. The neck mold has an axial end into which is inserted a neck pin or neck forming plunger. This plunger will shape the corkage bore of the neck of the bottle and also form a bubble in the glass into which air under pressure is introduced to blow the glass charge to a hollow shape in the blank mold and neck mold in the form of the hollow parison. The neck finish part of the ware is shaped in the parison forming unit and this portion of the glass, that is the neck, is held by the neck mold for transfer of the formed parison to another mold, referred to as the blow mold, wherein the rest of the forming operation is completed.

In prior machines operated by the blow-and-blow process, the glass is settled into the neck mold and in contact with the metal of the neck pin. The neck pin is usually constructed as a single piece tapered nose plunger made of a single metal or alloy. Heat is extracted from the glass that contacts the neck pin at a uniform rate such that a skin or enamel is set up on the surface of the glass of the corkage bore and internal bubble that is defined by the tapered neck pin positioned in the neck mold. The neck pin is thereafter withdrawn from contact with the glass for the application of counterblow air into the corkage bore and against the bubble for blowing the glass charge out to the shape of the hollow parison. However, since the bubble has had an enamel or skin of the surface glass formed by the mentioned heat extraction, counterblowing must be delayed until the enamel of the bubble is reheated and softened by interior heat from the mass of the glass charge. The enamel on the corkage bore may soften in the meantime so that it distorts or bulges inwardly during counterblow causing what is called a "choke" in the neck of the final article. This reheat time allowed to soften the enamel of the bubble is known as "corkage reheat" and it is performed by withdrawing the plunger and allowing the glass to remain in a quiescent state for a pre-determined period in which time the heat interiorly of the glass adjacent the bubble enamel is transmitted for softening the bubble enamel sufficiently to enable counterblowing.

During counterblowing, the air pressure expands the bubble and distributes the glass of the charge along the mold cavity. However, as the charge of the glass is settled in the blank mold, an enamel or skin is set up along the mold cavity due to the extraction of heat by the metal of the mold. During the corkage reheat period this skin is setting up progressively stronger, and when counterblowing occurs the stiffer glass or enamel along the mold wall is reluctant to distribute along the mold wall. The hotter and less viscous central glass of the mold charge will be distributed by counterblowing through the remainder of the mold to complete the parison shape. Thus, along the mold wall, the parison is made up of adjacent regions of glass that has received differential heat extraction or thermal treatment. When the parison is blown to the bottle shape in the final mold, it will be distributed in the wall of the bottle in accordance with the thermal characteristics established in the formation of the parison in the blank mold. This mentioned region of differential thermal treatment of the parison forms a region having an optical appearance of wavy glass, or a "settlewave" appearance in the wall of the final blown bottle.

The present invention obviates the above explained choke and settle wave difficulties in forming glassware. This is achieved by using a unique form of neck pin which incorporates slots in its tip portion region. The slots are such that at normal operating temperatures, the viscosity of the glass is high enough to resist flow into the slots of the tip but is supported and in contact in the bubble region with the metal protuberances between the slots. Also, air will become trapped in the slots and resist displacement by the glass preventing glass-to-metal contact at the slotted area. The suspended glass gives up heat at a much lesser rate to the metal of the plunger by reason of the insulating air layer in the slots.

As used herein, the terms "slots" or "slotted" are intended to include slots, grooves, waffle formation, and like means comprised of an array of surface projections and intermediate spaces or valleys.

By incorporating a series of parallel slots in the plunger tip, as will be described more particularly hereinafter, a temperature differential will be imparted to regions of the glass of the bubble surface. When the plunger is withdrawn, these regions of the bubble, opposite the slots, will be of lesser viscosity and enable almost immediate counterblowing thereby substantially eliminating corkage reheat time. On the other hand, during the time the plunger is in place in the neck mold, the metal of the plunger body will extract heat from the corkage bore sufficiently to set up a firm skin thereon. Then, due to the fact that counterblowing starts much earlier, this corkage bore skin will not be afforded a reheat time before counterblow to allow it to soften and deform and this will obviate the choked neck defect.

One further advantage of the invention is achieved by the slotted plunger tip of this invention. At the instant of plunger withdrawal in the process, the air that is trapped in the slots will help to relieve the low pressure condition that may arise in the space between the plunger and the surface of the glass bubble. In turn, this relief prevents the glass bubble from collapsing and causing a defective article. In short, the plunger design permits easier separation of the plunger and the glass in the neck mold.

It is accordingly an object of the present invention to provide a parison molding unit and method capable of eliminating settlewave and chokes in the necks of blown glass containers.

Another object of the invention is to provide an improved neck pin or plunger in a parison molding unit combination.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a sectional elevational view of an I.S. type glass parison forming apparatus, including the present invention.

FIG. 2 is an elongated sectional elevational view illustrating in greater detail one form of the improved neck pin of the present invention.

FIG. 3 is a plan view of the neck pin of the invention shown on FIG. 2.

FIG. 4 is a segmented sectional elevational view illustrating the glass-metal interface between the improved neck pin of this invention and the glass of the formed bubble.

FIG. 5 is a sectional elevational view illustrating a second embodiment of the present invention in which a different form of the improved neck pin is utilized; and FIG. 6 is a plan view of the form of neck pin of the invention shown on FIG. 5.

Referring to FIG. 1, an inverted blank mold 10 comprised of half sections 11 and 12 are mounted on mold arms (not shown) at the re-entrant flange 13. The arms are manipulated for moving the mold sections 11 and 12 toward and away from each other, and, as shown, the mold sections are in a glass forming position. The sections 11 and 12 are the body mold of the parison forming unit and define a parison cavity 14 which has a top opening around a baffle seating surface 15 and a lower opposite end opening. The mold 10 fits around an annular dovetail 16 of a closed partible neck mold 17 carried on the I.S. invert arms 18 in a conventional manner. The neck mold in its closed glass forming position defines the neck finish forming cavity for a given bottle. The cavity conforms to and registers with the lower end opening of the blank mold. The top opening of the blank mold receives a funnel member 19 having a central, axial guide passage 20 for a "gob" of glass. The "gob" of glass is an illustrative form of mold charge fed to the parison forming unit by known means (not shown).

After the glass gob is loaded to the cavity 14, the glass is settleblown, as shown on FIG. 1, to form the glass in the neck mold and around a neck pin 21. To do this, a baffle 22 is brought over the funnel 19 and seated on the complementary seat face of the funnel. The baffle has air passages 24 connected to a source of settleblowing air under pressure. As conventional manner, the machine timing and control system (not shown) provides for moving the baffle 22 to seat on the funnel, it turns on the settleblow air for a predetermined time, and when the glass charge is settleblown in the mold, the baffle is moved away from the funnel seat. In rapid sequence, the funnel is then lifted and removed from the baffle seat 15 of the mold 10. The baffle has an end forming surface 25 which closes the end opening of the cavity 14 and provides a surface for forming the end of the parison opposite the neck finish. The timing system and fluid-operated mechanism for achieving these manipulations are described in the Ingle patent, 1,911,119 and should easily be comprehended from that description by those skilled in the art without further burdening this disclosure with a detailed description of such mechanisms.

Associated with the underside of the neck mold 17 is the neck pin unit 21. As may be seen on FIG. 2, this neck pin or plunger has a solid metal body portion 21a that is generally cylindrical and tapered somewhat axial inwardly to a contiguous integral nose or tip portion 21b that is generally hemispherical or rounded. The tip portion 21b will contact the glass in the neck mold 17 to form the glass bubble surface 40 (see FIG. 4). The tip 21b of the plunger 21 is formed with a series (plurality) of spaced elongated side-by-side slots 41. In a preferred form of the invention, these plural slots are peripherally annularly arranged and spaced concentrically about the central axis of plunger 21, as shown on FIG. 3.

The second form of neck pin is shown on FIGS. 5 and 6, and is constructed as follows. (Wherever the parts or their design is common with those described above for FIG. 2, the same numerals are used. Where a different configuration or design is involved, the parts are designated by the numeral plus the prime sign.)

The neck pin unit 21' has a similar cylindrical solid metal body 21a' that is tapered upwardly and outwardly to the annular ring 21c' which telescopically slides in the cylindrical bore of the tubular thimble 28. The neck pin 21' has a nose or tip portion 21b' that includes an outwardly facing radius 21d' and an upstanding and axially inwardly extending wall 21e'. The wall 21e' has a corner radius annularly of the innermost extremity of the tip 21b' such that it forms an end peripheral ring 21f' of the tip 21b'. Radially inwardly of the ring 21f' the tip 21b' has a concavely contoured glass bubble supporting face 21g'. Prior art attempts at this form of neck pin contour have been unsuccessful because a re-entrant cavity of the plunger tip design has been used which did not successfully support the glass of the bubble and the bubble interior collapses upon withdrawal of the plunger tip; and, the plunger tip is required to stay in place such an extended period to cause the glass enamel to be self-supporting, the objectives of this invention involving early counterblow are unattainable.

The bubble supporting face 21g' of the neck pin 21b' is, in its preferred form, provided with a series (plurality) of spaced apart, concentric, parallel slots 41' and may include a center (axis oriented) such slot 41a'.

The neck pin 21b' of FIG. 5 has one further feature, in that a seal ring 21h' is provided in the body region of the neck pin to obviate air seepage into the neck cavity while the neck pin is in the "up" position. Ring 21h' also serves as a slide guide in the bore of the thimble 28.

Referring to FIGS. 1, 2 and 5, the neck pin 21 or 21' reciprocates in a tubular thimble 28 positioned in glass forming relation with the neck mold 17 such that the upper edge of the thimble is inwardly contoured and provides the radius at the outer rim or crown of the neck finish that is adjacent the corkage bore thereof. The thimble is connected to the outer hollow piston 31 of the fluid-operated cylinder-piston assembly, referred to generally at 32. The cylinder piston assembly 32 is fastened to the frame 34 of the machine. The cylinder has an upper cylinder head 35 that forms a cylindrical guide for reciprocal movement of the thimble 28. There is a second internal concentric piston and piston rod that is connected to the neck pin 21b by means of clamp 33.

Air or fluid pressure lines 51 and 52 are connected to the lower end of cylinder 32 to furnish fluid under pressure for causing the raising and lowering movements of the neck pin 21 and separately controllable for causing, raising or lowering movements of the thimble 28. These fluid lines are connected to the conventional timing valve on the I.S. machine operated in sequence by a machine timing drum for controlling the application of fluid under pressure to the mechanism at the proper time. An example of this desired timing sequence for immediate action in pulling the neck pin after settling the glass in the blank mold, neck mold combination, is set forth in an application Ser. No. 253,541, filed Jan. 24, 1963 (now abandoned) and owned by the assignee of this application.

This preferred cycle will operate as follows. The neck mold will be closed by manipulation of its carrier arms 18 and the blank mold 11, 12 will be closed about the registering surface 16 of the neck mold to provide a contiguous parison forming cavity that is open at both axial ends. The funnel will be positioned over the top opening of the blank mold and prior to this the thimble 28 will be raised and the neck pin 21 will likewise be raised to be inserted within the neck mold cavity. The molten glass charge C is loaded through the funnel 19 and into the cavity of the blank mold. The baffle 22 is then placed over the funnel and settleblow air is emitted through the passages 24 to settle the charge C around the neck pin 21 and compactly in the neck mold cavity. In settleblowing, the glass and metal interface will be that substantially as shown in FIG. 4. The slots 41 will retain the encapsulated air and form strips or orbital zones of differential flow properties or viscosities of the glass along this glass-metal interface. In the preferred embodiment, these zones are deposited concentrically about the axis of the neck pin on the tip portion 21b thereof. Almost immediately after settleblowing occurs, the neck pin 21 is withdrawn and the funnel and baffle are lifted. The baffle is then replaced over the top opening of the blank mold along the faces 15 to form a top closure for the blank mold. Now counterblow air is admitted by pipe 54 connected internally of cylinder 32 to passage 44, 45 in the neck pin. With neck pin 21 withdrawn, passage 45 is connected to the central passage of thimble 28. This counterblowing is done as soon as the mechanical manipulation of the parts aforementioned is completed to make up the closed blank mold. The skin that may have formed by the metal-glass interface on the raised portions of the plunger tip will of course, in the normal fashion resist counterblow, however, the thermally insulated portions of the glass opposite slots 41 will allow counterblowing to commence. Once the glass has initiated counterblowing at the bubble region, the completion of the parison forming step will continue to final shaping of the parison in the blank mold-neck mold cavity. On the otherhand, the glass at the corkage bore region 42 will be firm due to the glass-to-metal interface for heat extraction thereat. By reason of the counterblow being performed early, i.e., elimination of corkage reheat time, the skin of the glass in the corkage bore region 42 will not be allowed a chance to reheat and soften and will remain firm and thereafter cool progressively once the neck pin is pulled and counterblow air is applied. This eliminates substantially choked neck defects often encountered in the I.S. press-and-blow process wherein heretofore the nature of the process has required substantial corkage bore reheat time. Along with this, since the differential or heat treatment of the glass lying along the blank mold wall is less due to the time between settleblow and counterblow, the settlewave problem is effectively dealt with by the present invention and settlewave in the finally blown ware is substantially eliminated.

While two embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:
1. In a glass parison forming apparatus comprising a neck mold defining a neck finish forming cavity having an axial end opening, a blank mold, means independently supporting said neck mold and blank mold in a glass forming position defining a glass parison shaping cavity, a neck pin, and means supporting the neck pin for reciprocating movement in the axial end opening of the neck finish forming cavity and into and out of said neck cavity, the improvement wherein the neck pin (21, 21') comprises a body (21a, 21a') and a tip (21b, 21b') attached on the forward end of said body, the tip being inserted into the neck forming cavity by said reciprocating means to contact the glass and form a corkage bore portion surrounding a bubble forming portion in the glass in the neck finish forming cavity, said bubble forming portion of said tip being formed with a symmetrical array of surface projections (41, 41') and intermediate spaces which result in closed bottom cavities such that the glass is contacted by said surface projections forming a plurality of symmetrically disposed relatively cool areas and intermediate relatively uncooled areas in the respective areas of the glass adjacent said projections and said spaces.

2. The apparatus set forth in claim 1 wherein said symmetrical array of projections comprises annular concentric projections and said intermediate spaces comprise annular concentric slots.

3. The combination set forth in claim 2 wherein said bubble forming portion of the tip is convex.

4. The combination set forth in claim 2 wherein said bubble forming portion of the tip is concave.

References Cited

UNITED STATES PATENTS 2,142,954  1/1939  Rowe _____ 65—76
2,648,168  11/1953  Rowe _____ 65—76

DONALL H. SYLVESTER, *Primary Examiner.*

F. W. MIGA, *Assistant Examiner.*